United States Patent
Ragupathi et al.

(10) Patent No.: US 10,203,733 B2
(45) Date of Patent: Feb. 12, 2019

(54) SYSTEMS AND METHODS FOR RECOMMENDING OPTIMUM DATACENTER PARAMETERS TO MEET RACK LEVEL AIRFLOW CONSTRAINTS

(71) Applicant: DELL PRODUCTS, L.P., Round Rock, TX (US)

(72) Inventors: Dinesh Kunnathur Ragupathi, Round Rock, TX (US); Hasnain Shabbir, Round Rock, TX (US); Dominick A. Lovicott, Round Rock, TX (US)

(73) Assignee: Dell Products, L.P., Round Rock, TX (US)

( * ) Notice: Subject to any disclaimer, the term of this patent is extended or adjusted under 35 U.S.C. 154(b) by 296 days.

(21) Appl. No.: 15/158,134

(22) Filed: May 18, 2016

(65) Prior Publication Data

US 2017/0336838 A1    Nov. 23, 2017

(51) Int. Cl.
*G06F 1/00* (2006.01)
*G06F 1/20* (2006.01)

(52) U.S. Cl.
CPC .................... *G06F 1/206* (2013.01)

(58) Field of Classification Search
CPC .................... G06F 1/20; G05B 15/02
See application file for complete search history.

(56) References Cited

U.S. PATENT DOCUMENTS

| | | | | |
|---|---|---|---|---|
| 2009/0088873 | A1* | 4/2009 | Avery | G06F 1/206 700/51 |
| 2011/0301911 | A1* | 12/2011 | VanGilder | G06F 17/5004 702/136 |
| 2012/0290135 | A1 | 11/2012 | Bentivegna et al. | |
| 2013/0179558 | A1* | 7/2013 | Lin | H04L 41/04 709/223 |
| 2014/0074444 | A1 | 3/2014 | Hamann et al. | |
| 2014/0104784 | A1* | 4/2014 | Chen | G06F 1/206 361/679.47 |

(Continued)

OTHER PUBLICATIONS

B.R. Mehta and Y. Jaganmohan Reddy, Industrial Process Automation Systems, Butterworth-Heinemann, Nov. 26, 2014.*

*Primary Examiner* — Christopher E. Everett
(74) *Attorney, Agent, or Firm* — Isidore PLLC

(57) ABSTRACT

A method and an information handling system (IHS) determine optimum ambient temperature conditions for targeting desired system cooling constraints. According to one aspect, a target parameter recommendation module (TPRM) receives a target cooling parameter value for a number of servers having an identified configuration. The TPRM identifies an acceptable range of ambient conditions, corresponding to the received target parameter value(s). The TPRM determines via a series of iterations whether the target parameter value is attainable using the acceptable range of ambient conditions. If the target parameter value is attainable, the TPRM provides a first notification identifying ambient conditions by which the target parameter value can be attained. However, if the target parameter value is not attainable using the acceptable range of ambient conditions, the TPRM provides a second notification recommending an adjustment to server cooling constraints and/or the identified system configuration.

16 Claims, 8 Drawing Sheets

(56) References Cited

U.S. PATENT DOCUMENTS

| | | | |
|---|---|---|---|
| 2014/0190681 A1* | 7/2014 | Chainer | H05K 7/20836 165/289 |
| 2014/0371920 A1* | 12/2014 | Varadi | G05B 13/048 700/276 |
| 2015/0181747 A1* | 6/2015 | Bailey | H05K 7/20736 361/679.48 |
| 2016/0234972 A1* | 8/2016 | Billet | H05K 7/20836 |

* cited by examiner

SYSTEMS AND METHODS FOR RECOMMENDING OPTIMUM DATACENTER PARAMETERS TO MEET RACK LEVEL AIRFLOW CONSTRAINTS

BACKGROUND

1. Technical Field

The present disclosure generally relates to information handling systems and in particular to server rack airflow within datacenters.

2. Description of the Related Art

As the value and use of information continue to increase, individuals and businesses seek additional ways to process and store information. One option available to users is information handling systems. An information handling system (IHS) generally processes, compiles, stores, and/or communicates information or data for business, personal, or other purposes, thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

IHS cooling within a datacenter presents significant challenges to information technology (IT) and datacenter managers to allocate optimal resources within the constraints of the design. One of the major challenges within any datacenter is managing cooling resources for corresponding IT equipment. For air-cooled rack based installations, airflow to the rack is becoming a precious commodity and efficient use of airflow is critical to successful datacenter operation. Outside of power concerns, airflow related issues has become a limiting factor for maximizing rack density.

Further challenges are presented by the fact that a number of adjustable parameters associated with server cooling are limited by datacenter design. For example, these parameters can include inlet airflow temperature and maximum airflow per rack. Currently there is no method or concept available for a customer to use an automated process to understand and/or determine an optimum environment that can be provided to the installed servers to maximize IHS performance while providing cooling efficiency.

BRIEF SUMMARY

Disclosed are a method and an information handling system (IHS) that determine optimum ambient temperature conditions for targeting desired system cooling constraints. According to one aspect, a target parameter recommendation module (TPRM) receives a target cooling parameter value for a number of servers having an identified configuration. The TPRM identifies an acceptable range of ambient conditions, corresponding to the received target parameter value(s). The TPRM determines via a series of iterations whether the target parameter value is attainable using the acceptable range of ambient conditions. If the target parameter value is attainable, the TPRM provides a first notification identifying ambient conditions by which the target parameter value can be attained. However, if the target parameter value is not attainable using the acceptable range of ambient conditions, the TPRM provides a second notification recommending an adjustment to server cooling constraints and/or the identified system configuration.

According to one or more aspects, the TPRM initiates an iterative process using an acceptable range of inlet temperature values to target an airflow consumption limit specified for the servers having the identified configuration. The TPRM transmits, during each iteration of the iterative process, a corresponding successive value(s) for inlet temperature from an open management power center (OMPC) device/console to each respective server controller to enable calculation of each respective airflow consumption value. The TPRM receives each respective airflow consumption value from each respective server controller and aggregates airflow consumption values from the respective server controllers to determine an aggregated airflow consumption value. If the TPRM determines that the aggregated consumption value matches the airflow consumption limit, the TPRM provides a first notification that identifies a corresponding inlet temperature value used to attain the airflow consumption limit. However, if the TPRM determines that the aggregated consumption value does not match the airflow consumption limit, the TPRM determines whether a last iteration of the series of iterations has been completed. If the last iteration has not been completed, the initiated iterative process continues. However, if the last iteration has been completed, the TPRM provides a second notification indicating that the airflow consumption limit is unattainable for the servers and recommends an adjustment to server cooling parameter constraints and/or the identified configuration.

The above summary contains simplifications, generalizations and omissions of detail and is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed written description.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1:
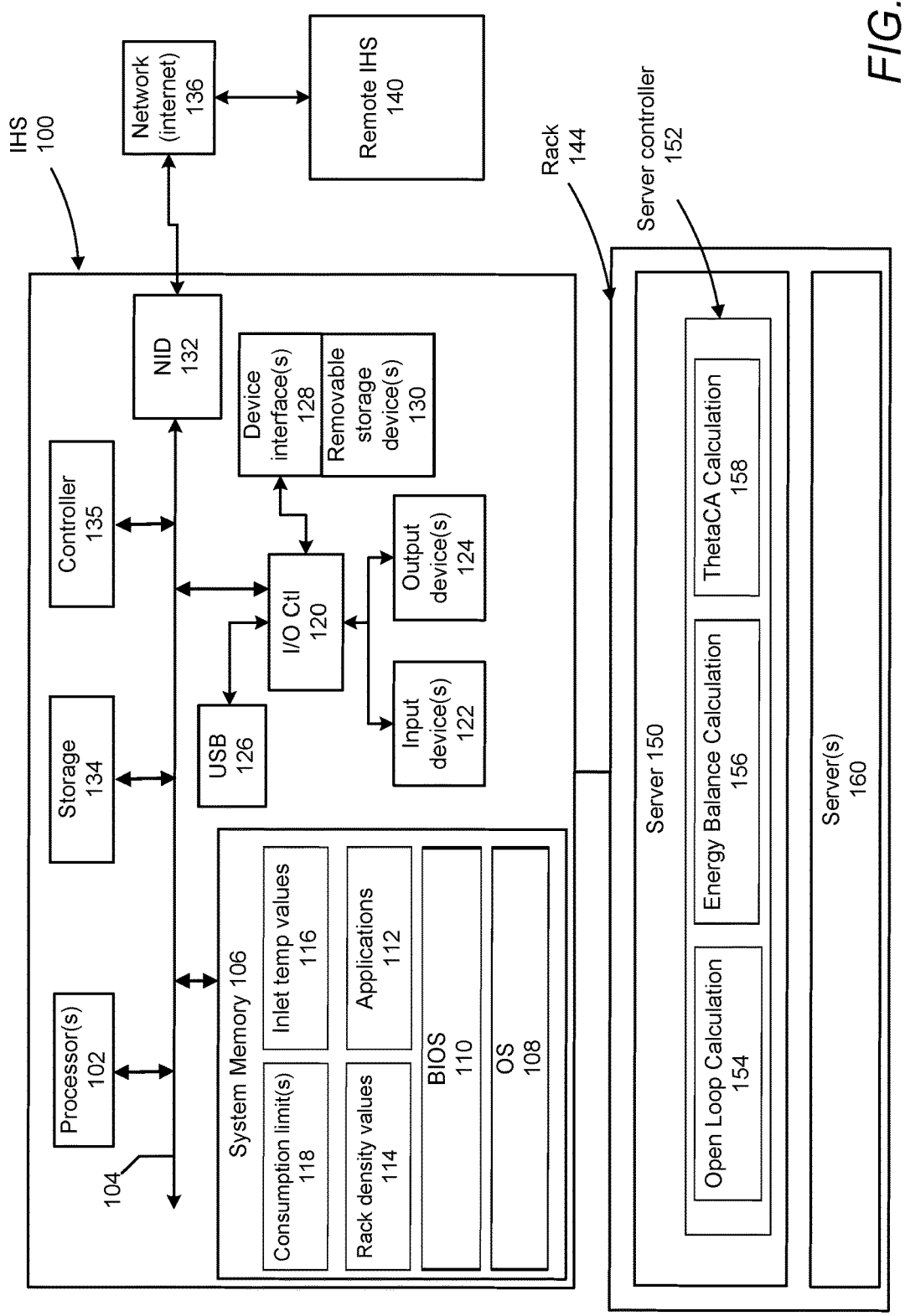
FIG. 1 illustrates an example information handling system (IHS) within which various aspects of the disclosure can be implemented, according to one or more embodiments.

The illustrative embodiments provide a method and an information handling system (IHS) that determine optimum ambient temperature conditions for targeting desired system cooling constraints. According to one aspect, a target parameter recommendation module (TPRM) receives a target cooling parameter value for a number of servers having an identified configuration. The TPRM identifies an acceptable range of ambient conditions, corresponding to the received target parameter value(s). The TPRM determines, via a series of iterations, whether the target parameter value is attainable using the acceptable range of ambient conditions. If the target parameter value is attainable, the TPRM provides a first notification identifying ambient conditions by which the target parameter value can be attained. However, if the target parameter value is not attainable using the acceptable range of ambient conditions, the TPRM provides a second notification recommending an adjustment to the server cooling constraints and/or the identified system configuration.

In the following detailed description of exemplary embodiments of the disclosure, specific exemplary embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not other embodiments.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that term is utilized.

Those of ordinary skill in the art will appreciate that the hardware, firmware/software utility, and software components and basic configuration thereof depicted in the following figures may vary. For example, the illustrative components of IHS 100 are not intended to be exhaustive, but rather are representative to highlight some of the components that are utilized to implement certain aspects of the described embodiments. For example, different configurations of an IRS may be provided, containing other devices/components, which may be used in addition to or in place of the hardware depicted, and may be differently configured. The depicted example is not meant to imply architectural or other limitations with respect to the presently described embodiments and/or the general invention.

FIG. 1 illustrates a block diagram representation of an example information handling system (IHS) 100, within which one or more of the described features of the various embodiments of the disclosure can be implemented. For purposes of this disclosure, an information handling system, such as IHS 100, may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a handheld device, personal computer, a server, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Referring specifically to FIG. 1, there is illustrated a block diagram representation of IHS 100 which is communicatively coupled to multiple rack-based servers 150 and 160.

IHS 100 includes one or more processor(s) 102 coupled to system memory 106 via system interconnect 104. System interconnect 104 can be interchangeably referred to as a system bus, in one or more embodiments. Also coupled to system interconnect 104 is storage 134 within which can be stored one or more software and/or firmware modules and/or data (not specifically shown). In one embodiment, storage 134 can be a hard drive or a solid state drive. The one or more software and/or firmware modules within storage 134 can be loaded into system memory 106 during operation of IHS 100. As shown, system memory 106 can include therein a plurality of modules, including Basic Input/Output System (BIOS) 110, operating system (O/S) 108, applications 112 and firmware (not shown). In addition, system memory 106 includes rack density values 114, inlet temperature values 116 and airflow consumption limits 118.

In one or more embodiments, BIOS 110 comprises additional functionality associated with unified extensible firmware interface (UEFI), and can be more completely referred to as BIOS/UEFI 110 in these embodiments. The various software and/or firmware modules have varying functionality when their corresponding program code is executed by processor(s) 102 or other processing devices within IHS 100.

IHS 100 further includes one or more input/output (I/O) controllers 120 which support connection to and processing of signals from one or more connected input device(s) 122, such as a keyboard, mouse, touch screen, or microphone. I/O controllers 120 also support connection to and forwarding of output signals to one or more connected output device(s) 124, such as a monitor or display device or audio speaker(s). In addition, IHS 100 includes universal serial bus (USB) 126 which is coupled to I/O controller 120. Additionally, in one or more embodiments, one or more device interface(s) 128, such as an optical reader, a universal serial bus (USB), a card reader, Personal Computer Memory Card International Association (PCMCIA) port, and/or a high-definition multimedia interface (HDMI), can be associated with IHS 100. Device interface(s) 128 can be utilized to enable data to be read from or stored to corresponding removable storage device(s) 130, such as a compact disk (CD), digital video disk (DVD), flash drive, or flash memory card. In one or more embodiments, device interface(s) 128 can also provide an integration point for connecting other device(s) to IHS 100. In one implementation, IHS 100 connects to remote IHS 140 using device interface(s) 128. In such implementation, device interface(s) 128 can further include General Purpose I/O interfaces such as $I^2C$, SMBus, and peripheral component interconnect (PCI) buses.

Figure 2:
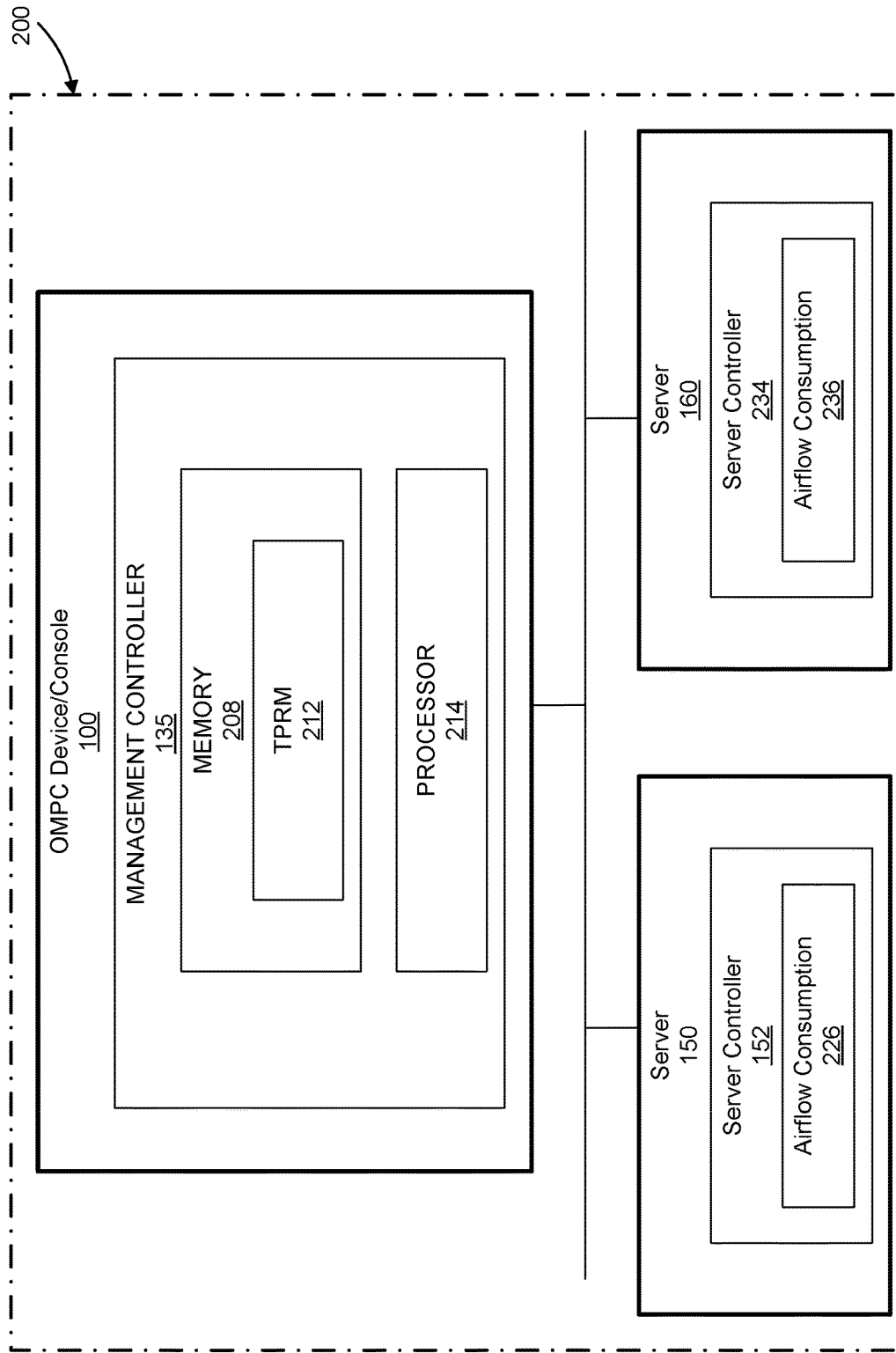
FIG. 2 illustrates an IHS having an open management power center (OMPC) device and a pair of servers, according to one or more embodiments.
Figure 3:
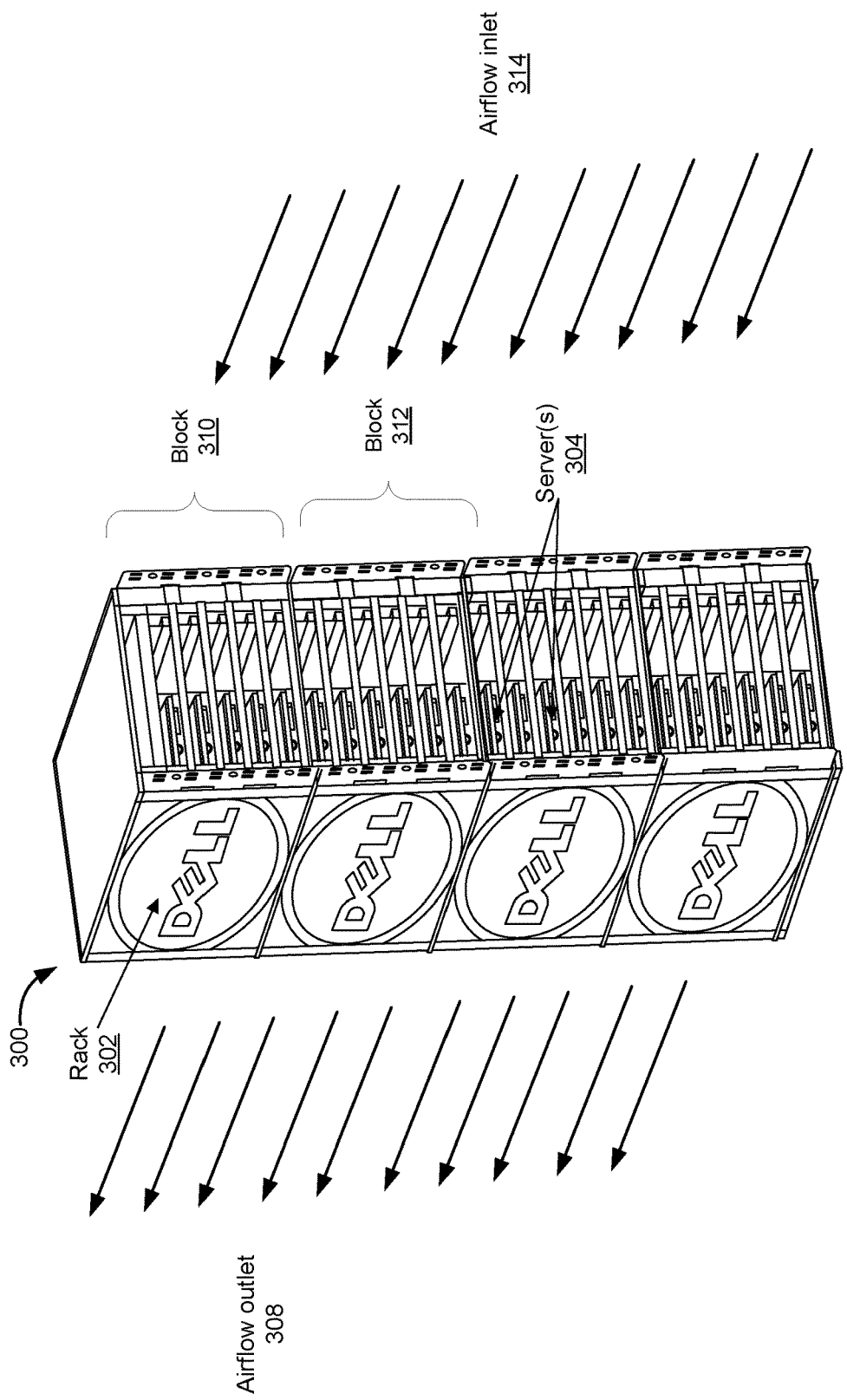
FIG. 3 illustrates a rack-based IHS that includes a number of servers, according to one embodiment.

As illustrated, servers 150 and 160 are located/placed within a larger structure of an IT rack 144 which is further illustrated in FIG. 3 as rack 302. Servers 150 and 160 comprise a number of components that enable a set of calculations to be computed. Server 150, using a server controller 152, is able to calculate fan speed by performing a set of calculations involving one or more of (a) an energy balancing calculation module 156, (b) an open loop cooling system model/calculation 154, and (c) a case-to-ambient thermal resistance (ThetaCA) calculation module 158. Server 160 includes a server controller (not shown) which is similarly configured to server controller 152 of server 150. Using the corresponding fan speed, server controllers 152 and 234 (FIG. 2) respectively determine airflow consumption values.

IHS 100 comprises a network interface device (NID) 132. NID 132 enables IHS 100 to communicate and/or interface with other devices, services, and components that are located external to IHS 100. These devices, services, and components can interface with IHS 100 via an external network, such as example network 136, using one or more communication protocols. In particular, in one implementation, IHS 100 uses NID 132 to connect to remote IHS 140 via an external network 136.

Network 136 can be a wired local area network, a wireless wide area network, wireless personal area network, wireless local area network, and the like, and the connection to and/or between network 136 and IHS 100 can be wired or wireless or a combination thereof. For purposes of discussion, network 136 is indicated as a single collective component for simplicity. However, it is appreciated that network 136 can comprise one or more direct connections to other devices as well as a more complex set of interconnections as can exist within a wide area network, such as the Internet.

IHS 100 further comprises management controller 135, by which IHS 100 communicates with servers 150 and 160 to determine optimum IHS cooling parameters for datacenter servers. IHS 100 is also described herein as open management power center (OMPC) device/console 100.

With specific reference now to FIG. 2, there is depicted a data-center environment (DCE) having an open management power center (OMPC) device/console and a pair of servers which are located within a rack, according to one embodiment. As described herein, the OMPC represents central control and management for a data-center's power consumption. For example, OMPC can also represent the DELL™ OpenManage™ Power Center management console. It should be appreciated that use of the term "OMPC" does not impose any limitation on the invention.

Referring again to FIG. 2, data-center environment (DCE) 200 comprises OMPC device 100, which includes management controller 135. DCE 200 also includes one or more servers 150, 160 each having a respective server/node controller 152, 234. Management controller 135 comprises processor 214 and memory system 208 coupled to processor 214. In addition, management controller 135 comprises target parameter recommendation module (TPRM) 212, which is executed by processor 214 to provide the power management functions of the OMPC device 100. OMPC device 100 communicates, using management controller 135, with respective server controller(s) 152, 234 of the corresponding server(s). Additionally, server controllers 152 and 234 respectively comprise airflow consumption values 226 and 236.

During operation TPRM 212 receives, from a user or datacenter manager, at least one target parameter value identifying server cooling parameter constraints corresponding to a selected configuration for the servers. TPRM 212 identifies a series of controlled values, from an acceptable range of ambient conditions corresponding to the received target parameter value. TPRM 212 iteratively determines, using the series of controlled values, whether the target parameter value(s) is attainable for the servers. In response to determining that the target parameter value(s) is attainable, TPRM 212 provides a first notification indicating that the target parameter value can be attained and identifies conditions by which the target parameter can be attained. However, in response to iteratively determining that the target parameter value is not attainable for the servers, TPRM 212 provides a notification indicating that the target parameter values are unattainable for the system/servers having the identified configuration. TPRM 212 then recommends an adjustment to the server cooling parameter constraints and/or the identified configuration.

In one embodiment, TPRM 212 receives, from a user or datacenter manager, an airflow consumption limit for the system and/or respective servers, corresponding to a specified system workload and configuration. TPRM 212 identifies an acceptable inlet temperature range using the received airflow consumption limit. The airflow consumption limit is a specific/pre-determined target parameter value associated with server cooling. In one or more related embodiments, TPRM 212 iteratively determines, using a sequence of inlet temperature values corresponding to the acceptable inlet temperature range, whether the consumption limit value is attainable. If the consumption limit is attainable, TPRM 212 provides the first notification, which indicates that the consumption limit is attainable for the identified configuration using an identified optimum inlet temperature value. However, if the consumption limit is not attainable for the identified configuration, TPRM 212 provides the second notification indicating that the airflow consumption limit is unattainable for the servers using the identified system/server configuration.

TPRM 212 determines whether the airflow consumption limit value is attainable using an iterative process that includes a series of iterations corresponding to the sequence of inlet temperature values. During each iteration, TPRM 212 transmits a successive value(s) for inlet airflow temperature from OMPC device 100 to each respective server controller to enable calculation of each respective airflow consumption value. TPRM 212 receives each airflow consumption value from each server controller. TPRM 212 aggregates airflow consumption values from respective server controllers to determine an aggregated airflow consumption value. TPRM 212 determines whether the aggregated consumption value matches or is substantially equal to the consumption limit value. In response to the aggregated consumption value matching or being substantially equal to the consumption limit value, TPRM 212 provides the first notification. However, in response to the aggregated consumption value not matching the consumption limit during a corresponding iteration, TPRM 212 continues the iterative process, if an inlet temperature value for a current iteration is not a last value in the sequence of inlet temperature values.

In one embodiment, server controllers 152 and 234 determines, using the corresponding inlet temperature value received from OMPC device 100, a corresponding fan speed by performing a set of calculations involving one or more of (a) an energy balancing calculation, (b) an open loop cooling system model, and (c) a case-to-ambient thermal resistance (ThetaCA) calculation. Using the corresponding fan speed, server controllers 152 and 234 respectively determine airflow consumption values.

In one implementation, server level thermal calculations to determine "CFM" (i.e., cubic feet per minute) consumption are performed using (i) an Open Loop calculation, (ii) an Energy Balance calculation and (III) a ThetaCA calculation. All three calculations are compared and a maximum fan speed/CFM consumption is sent back to OMPC (or more generically the multimode management console).

For the Open Loop Calculation, server fan control can include feedback temperature control, even as some components may not have temperature sensors. A "baseline" fan speed is established based on the ambient temperature of the server to ensure adequate cooling is provided for components not included in a feedback ("closed-loop") fan control. A baseline ambient fan curve is typically a function the configuration of the server (e.g. hardware presence and customer setting preferences). The open loop fan speed can be calculated for the simulated ambient temperature (i.e., the inlet air temperature value provided by OMPC device/console 100) in the determination of CFM consumption.

The Energy Balance Calculation is based on the First Law of Thermodynamics/Conservation of Energy. In this case, with an assumption of a thermal boundary being placed around the server, the inlet air temperature (i.e., ambient temperature), heat load (which is substantially equivalent to the power consumption of the server) and the exhaust air temperature requirement are considered. Using the energy balance equation, the required CFM is estimated to meet those conditions. The ambient temperature in the calculation is then adjusted to reflect the inlet temperature value provided by OMPC device/console 100.

ThetaCA refers to the thermal resistance between the component case and ambient air temperature. In many cases, CPU cooling is the dominant requirement for fan control. A characterization of the ThetaCA across the fan speed and/or airflow range can be performed and stored as coefficients within the server controller memory. The server controller can then estimate fan speed and/or CFM for a given ambient temperature, target temperature and measured component power. The ambient temperature in the calculation is then adjusted based on the inlet temperature value provided by OMPC device/console 100.

According to one or more aspects, TPRM 212 determines whether the airflow consumption limit is attainable by executing a series of iterations involving decreasing inlet temperature values. The iterative process is performed using decreasing inlet temperature values in response to the desired airflow consumption limit being less than an initial, current airflow consumption limit.

According to one or more aspects, TPRM 212 determines whether the aggregated airflow consumption limit value is attainable by executing a series of iterations involving increasing inlet temperature values. The iterative process is performed using increasing inlet temperature values in response to the aggregated airflow consumption limit being larger than an initial airflow consumption value.

According to one or more aspects, the at least one target parameter value comprises a first selected/target rack server density value, which is a smaller rack density value that is less than a current, initial/starting rack density value. In one or more implementations, a "rack density" or "rack server density" represents a number of supported servers in a rack. In addition, the at least one target parameter value comprises a consumption limit value vector corresponding to a series of values comprising (a) rack server density values ranging between the initial rack density value and the selected rack server density value and (b) the selected rack server density value. Furthermore, a length of the series of rack server density values indicates a corresponding number of server configurations for which respective consumption limit values are specified via the consumption limit value vector.

In one implementation, TPRM 212 executes a nested iterative process to determine whether the selected target rack density value can be attained while satisfying the corresponding airflow consumption limit. In particular, TPRM 212 executes the nested iterative process by utilizing an outer iterative process based on the series of rack server density values and an inner iterative process based on the consumption limit value vector.

According to one or more aspects, TPRM 212, in response to determining that the consumption limit value is unattainable using the initial rack density value, initiates the nested iterative process to determine whether the consumption limit value can be attained for the smaller selected rack density value via (i) the outer series of iterations utilizing decreasing values for rack server density and (ii) the inner series of iterations utilizing a sequence of inlet temperature values to target a corresponding consumption limit value. More generally, the sequence of inlet temperature values represent controlled ambient conditions that influence the system's airflow consumption and ultimately the system's ability to attain the airflow consumption limit.

In response to determining that the consumption limit value can be attained for the smaller rack density value, TPRM 212 provides a third notification indicating that the consumption limit value can be attained for the smaller rack density value and identifying an optimum inlet temperature value at which the corresponding consumption limit can be attained. In response to iteratively determining that the consumption limit cannot be attained for the selected, smaller rack density value, providing a fourth notification indicating that the consumption limit value cannot be attained for the smaller rack density value.

According to one or more related aspects, TPRM 212 receives, from a user or datacenter manager, target parameter values, including an airflow consumption limit and a selected, larger rack density value, which is larger than a current, initial rack density value. TPRM 212, in response to determining that the consumption limit value is attainable for the initial system/server configuration, initiates the nested iterative process to determine whether an attainment of the consumption limit can be maintained for the larger rack density value. TRPM 212 determines whether an attainment of the consumption limit can be maintained for the larger rack density value via (i) an outer series of iterations utilizing increasing values for rack server density and (ii) the inner series of iterations utilizing a sequence of inlet temperature values to target the corresponding airflow consumption limit.

In response to iteratively determining that an attainment of the consumption limit value can be maintained for the larger rack density value, TPRM 212 provides a third notification indicating that the consumption limit value can be maintained for the desired larger rack density value. In addition, TPRM 212 identifies an optimum inlet temperature value at which the consumption limit can be attained.

However, in response to iteratively determining that an attainment of the consumption limit value cannot be maintained for the larger rack density value, TPRM 212 provides a fourth notification indicating that the consumption limit value cannot be maintained for the larger rack density value. In addition, TPRM 212 identifies, from among the initial rack density value and the series of rack density values, a largest rack density value for which a corresponding consumption limit value can be attained.

In one or more embodiments, TPRM 212 iteratively determines whether at least one target parameter value is attainable for one or more of: (a) a single server; (b) multiple servers; (c) a rack of servers; (d) multiple racks of servers; and (e) an entire data center.

According to one or more aspects, TPRM 212 iteratively determines whether at least one target parameter value is attainable for (a) a first set of servers using a set of calculations performed by the server controllers to determine airflow consumption for various different inlet temperature values and (b) a second set of servers using pre-established estimated values for airflow consumption for various different inlet temperature values without utilizing calculations performed by a server controller.

FIG. 3 illustrates a rack-based IHS that includes a number of servers, according to one embodiment. As illustrated, IHS 300 comprises rack 302 which includes servers 304. Also illustrated within FIG. 3 is inlet airflow 314 and outlet airflow 308. OMPC device 100 is not specifically identified in FIG. 3. However, OMPC device 100 (FIG. 2) is coupled to servers 304 via respective server controllers (not shown). During operation of IHS 300, TPRM 212 specifies a particular inlet temperature for inlet airflow 314 to satisfy cooling performance requirements of IHS 300. Outlet airflow 308 is exhaust air resulting from server cooling that was performed using inlet airflow 314.

According to one or more aspects, TPRM 212 can specify various different inlet temperatures for different portions of inlet airflow 314 corresponding to different server blocks and/or servers of IHS 300. For example, TPRM 212 can specify a first inlet temperature value for first block of servers 310, and a different, second inlet temperature value for second block of servers 312. In one embodiment, TPRM 212 specifies inlet temperature values for respective servers in order to satisfy respective consumption limit values specified/pre-determined for the respective servers.

Although an IHS having a single rack of servers is illustrated, TPRM 212 can recommend/specify parameter values such as inlet temperature values and optimal rack density values that can recommend an optimum number of servers in an IHS for many different types of IHS configurations. For example, TPRM 212 can recommend parameter values and configuration values, such as rack density values, for a datacenter having an IHS comprising individual servers to an IHS comprising multiple adjacent racks of servers. Furthermore, the IHS can include one or more of various different types of architectures including various types of rack-based architectures.

Figure 4:
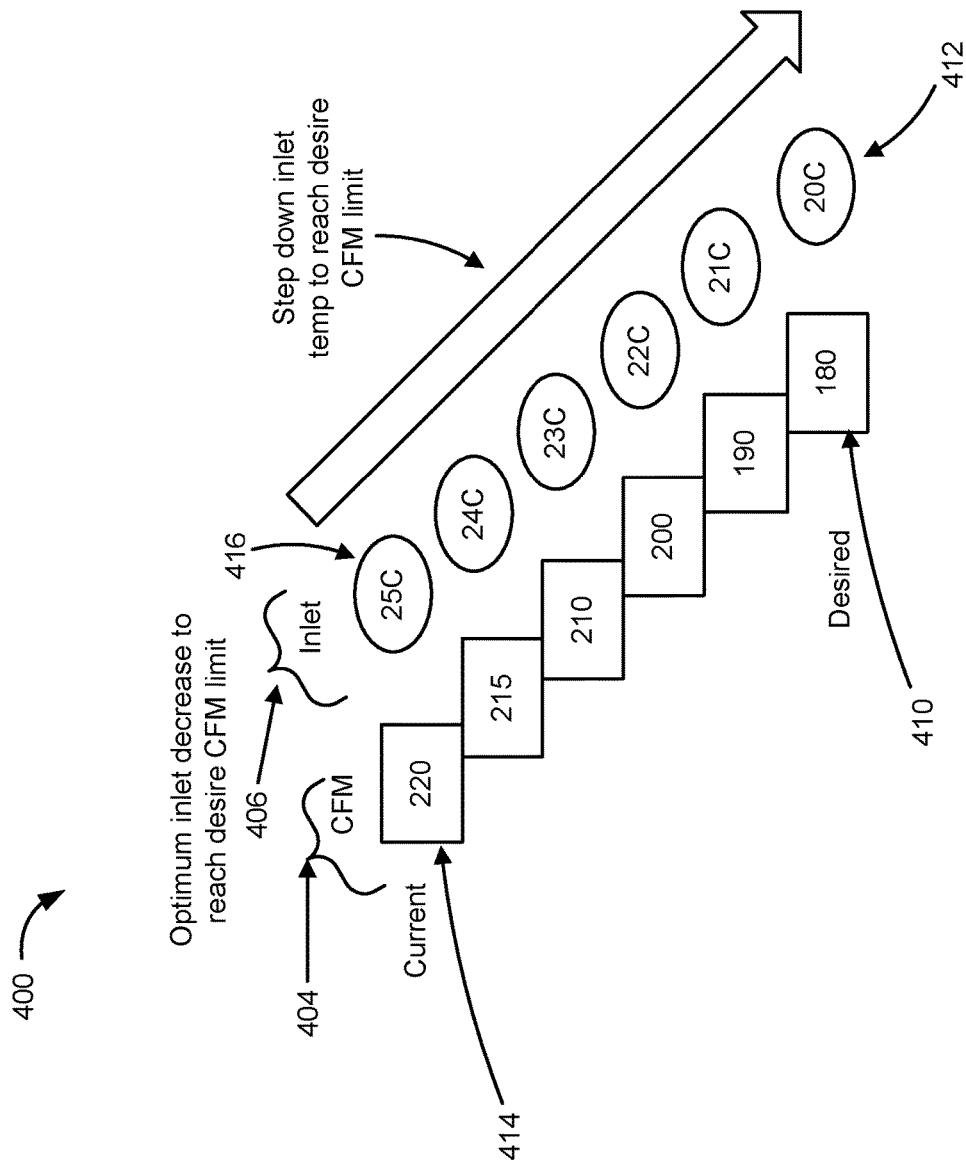
FIG. 4 provides a graphical depiction of a first series of iterations that is performed to target a specified consumption limit for a number of servers within IHS 300, according to one or more embodiments.

FIG. 4 provides a graphical depiction of an example first series of iterations that is performed to target a specified consumption limit for a number of servers within IHS 300, according to one or more embodiments. Iteration series 400 comprises an example series of decreasing inlet temperature values 406 and a corresponding example set of aggregate airflow consumption limits 404 which are also referred to by an air volume flow parameter "CFM" (i.e., cubic feet per minute). Inlet temperature values 406 include initial inlet temperature value 416 having a value of 25 degrees Celsius (25 C), and aggregate airflow consumption limits 404 include initial aggregate airflow consumption value 414 having a CFM value of 210.

According to the example of FIG. 4, TPRM 212 receives a user specified target/desired CFM limit 410 having a value of 180. Based on the initial CFM value of 210, the desired value of 180 indicates a desired expansion of rack cooling headroom. TPRM 212 executes a series of iterations using inlet temperature values 406 while excluding initial inlet temperature value 416 having a value of 25 C from the series of iterations. Furthermore, TPRM 212 can initiate the series of iterations using an even larger series of decreasing inlet temperature values to target the desired CFM value of 180. TPRM 212 identifies an acceptable range of inlet temperature values as a decreasing range of values, which include the portion of decreasing inlet temperature values 406 as a result of the desired CFM value of 180 being less than the initial CFM value of 210. Thus, a step value of "−1" is identified as the step value for the decreasing set of inlet temperature values, which, in one embodiment, are sequential integer values. During each iteration, TPRM 212 transmits a respective inlet temperature value from OMPC device 100 to each respective server controller to enable calculation of each respective airflow consumption value. TPRM 212 receives each calculated airflow consumption value from each server controller. TPRM 212 aggregates airflow consumption values from respective server controllers to determine an aggregated airflow consumption value or CFM value. TPRM 212 determines whether the aggregated consumption value matches or is substantially equal to the desired consumption limit. In response to the aggregated consumption value matching the consumption limit, TPRM 212 provides the first notification indicating that the consumption limit can be attained. However, in response to the aggregated consumption value not matching the consumption limit during a corresponding iteration, TPRM 210 continues the iterative process as long as an inlet temperature value for a current iteration is not a last value in the sequence of acceptable inlet temperature values. As indicated in iteration series 400, TPRM 212 performs a series of iterations until TPRM 212 determines that the desired CFM value of 180 can be attained using an inlet temperature of 20 C. As a result, TPRM 212 provides a notification recommending that the inlet temperature should be lowered to 20 C to attain the desired CFM limit of 180.

Figure 5:
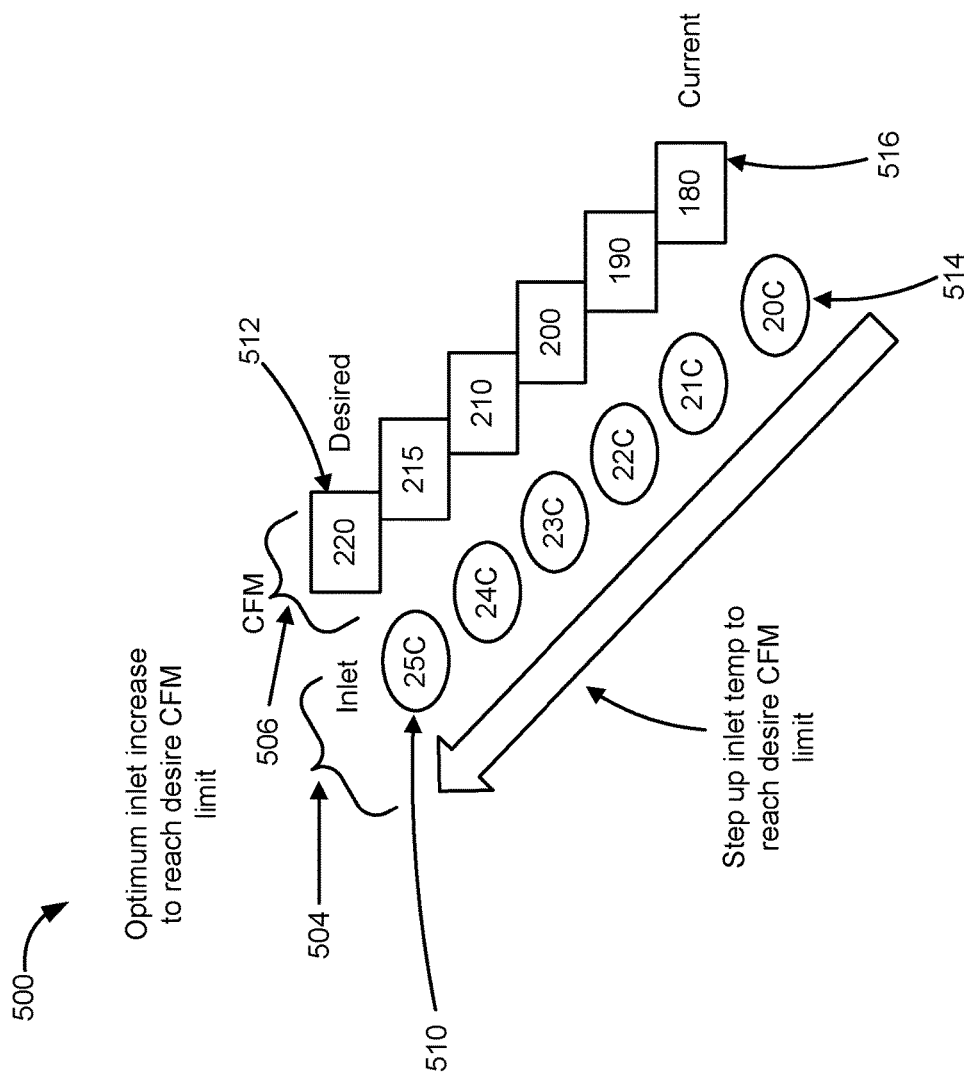
FIG. 5 provides a graphical depiction of a second series of iterations that is performed to target a specified consumption limit for a number of servers within IHS 300, according to one or more embodiments.

FIG. 5 provides a graphical depiction of a second series of iterations that is performed to target a specified consumption limit for a number of servers within IHS 300, according to one or more embodiments. Iteration series 500 comprises a series of increasing inlet temperature values 506 and a corresponding set of aggregate airflow consumption limits 504, which are also referred to by air volume flow parameter "CFM". Inlet temperature values 506 include initial inlet temperature value 516 having a value of 20 C, and aggregate airflow consumption limits 504 include initial aggregate airflow consumption value 514 having a CFM value of 180.

According to the example of FIG. 5, TPRM 212 receives a user specified target/desired CFM limit 510 having a value of 210. Based on the initial CFM value of 180, the desired value of 210 indicates a desired reduction of rack cooling headroom. TPRM 212 executes a series of iterations using a portion of inlet temperature values 506, where initial inlet temperature value 516 having a value of 20 C is excluded from the series of iterations. In one implementation, TPRM 212 selects a specified series of increasing inlet temperature values to target a desired CFM value, based on one or more of (a) ambient temperature constraints, (b) empirical testing and evaluation and (c) pre-established server/system cooling models. TPRM 212 identifies an acceptable range of inlet temperature values as an increasing range of values which include the portion of increasing inlet temperature values 506 as a result of the desired CFM value of 210 being larger than the initial CFM value of 180. Thus, a step value of "+1" is identified as the step value for the increasing set of inlet temperature values which are sequential integer values. Although a single unitary step value (i.e., −1, 1) is utilized within each of the examples of FIGS. 4 and 5, a different step value can be used. Furthermore, TPRM 212 can utilize multiple different step values including (i) larger, integer step values for a first subset of iterations and (ii) smaller, fractional step values as a final subset of iterations are being performed. During each iteration, TPRM 212 transmits a respective inlet temperature value from OMPC device 100 to each respective server controller to enable calculation of each respective airflow consumption value. TPRM 212 receives each calculated airflow consumption value from each server controller. TPRM 212 aggregates airflow consumption values from respective server controllers to determine an aggregated airflow consumption value or CFM value. TPRM 212 determines whether the aggregated consumption value matches or is substantially equal to the desired consumption limit. In response to the aggregated consumption value matching the consumption limit, TPRM 212 provides a notification/recommendation indicating that the consumption limit can be attained. However, in response to the aggregated consumption value not matching the consumption limit during a corresponding iteration, TPRM 210 continues the iterative process as long as an inlet temperature value for a current iteration is not a last value in the sequence of acceptable inlet temperature values. As indicated in iteration series 500, TPRM 212 performs a series of iterations until TPRM 212 determines that the desired CFM value of 210 can be attained using an inlet temperature of 25 C. As a result, TPRM 212 provides a notification recommending that the inlet temperature should be increased to 25 C to attain the desired CFM limit of 210.

Figure 6:
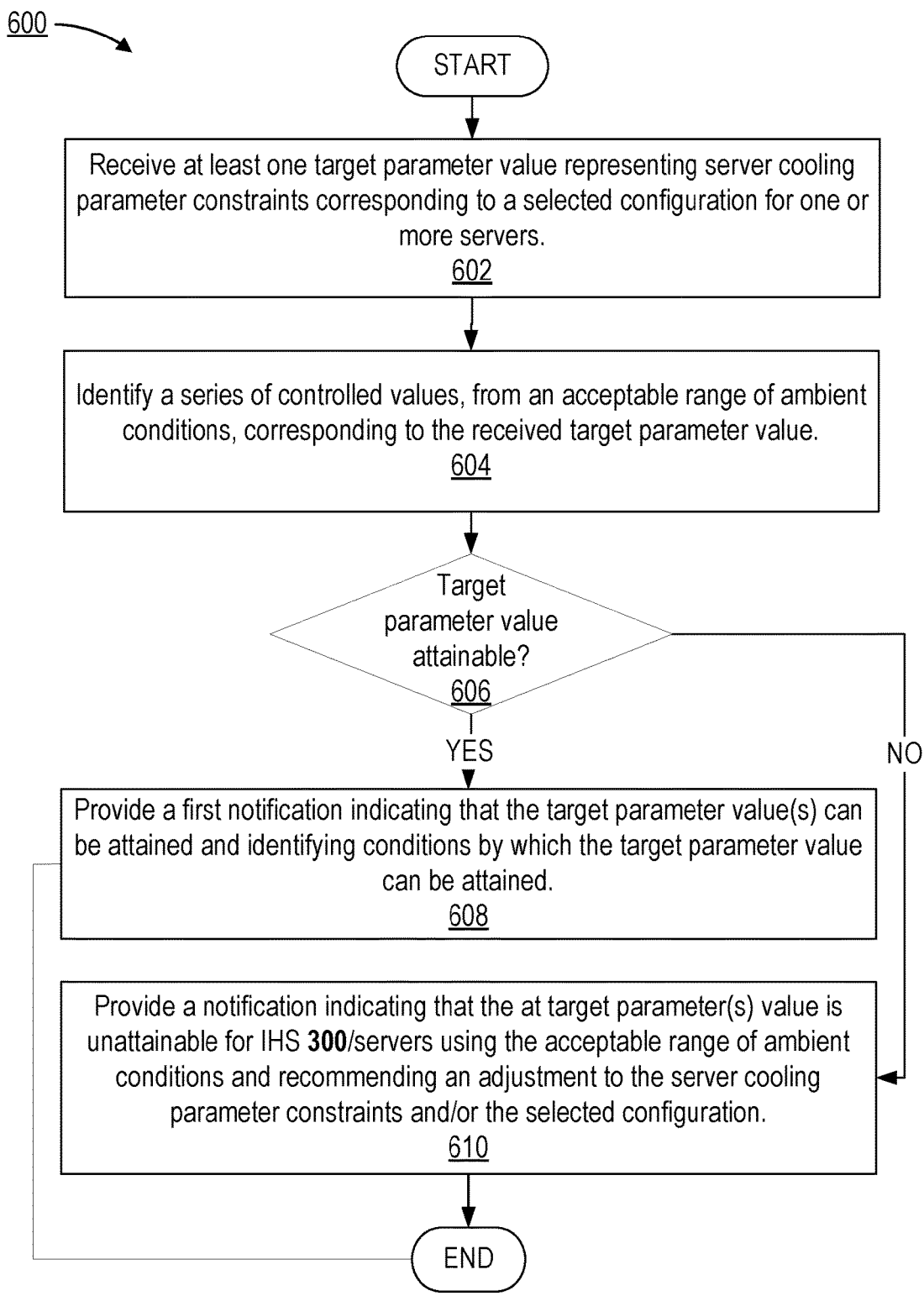
FIG. 6 is a flow chart illustrating a method for determining optimum ambient temperature conditions used to target desired cooling parameter constraints, according to one embodiment.
Figure 7:
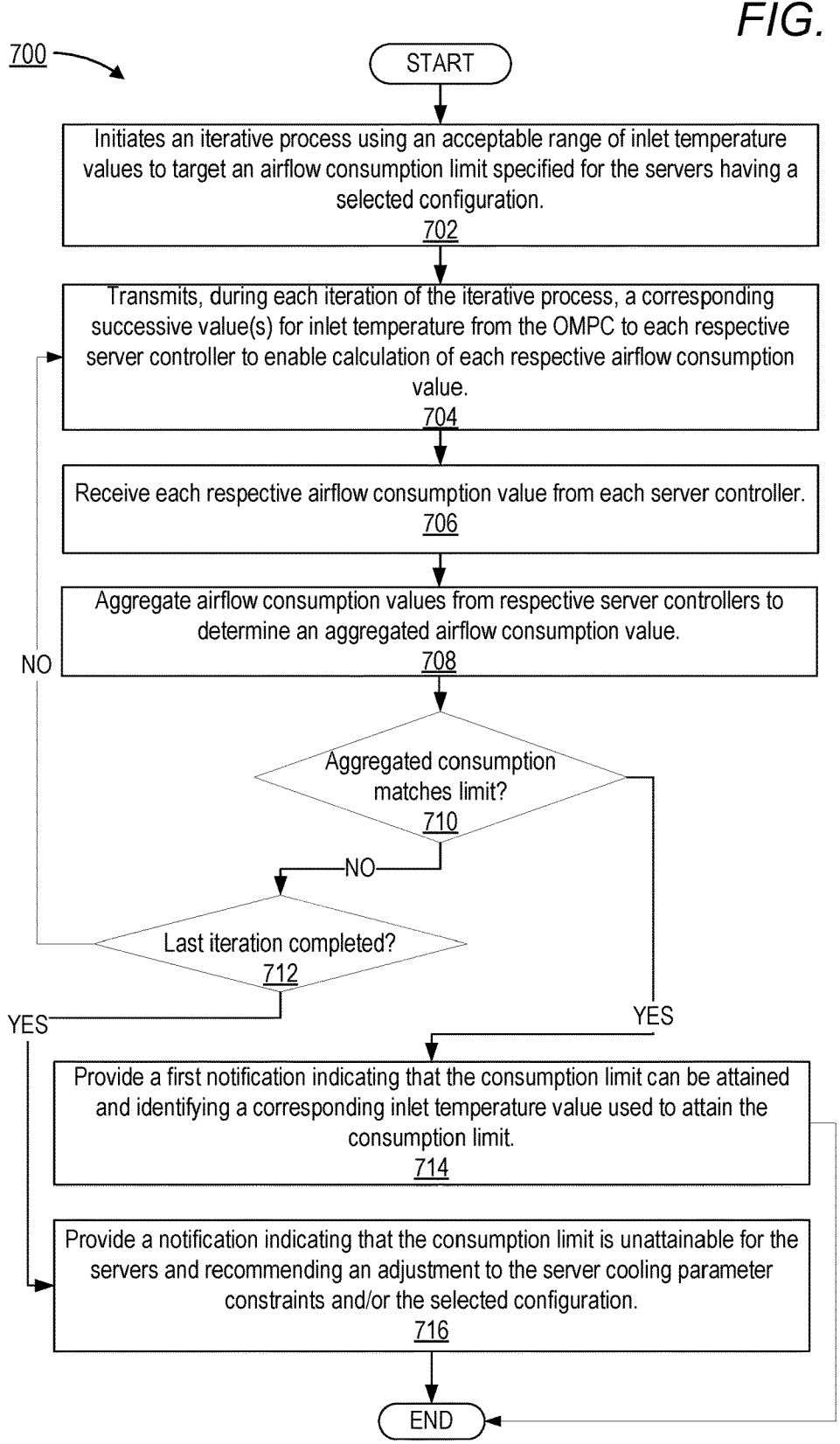
FIG. 7 is a flow chart illustrating a method for determining optimum inlet temperature values that can be used to target an airflow consumption limit(s) identified for IHS 300, according to one embodiment.
Figure 8:
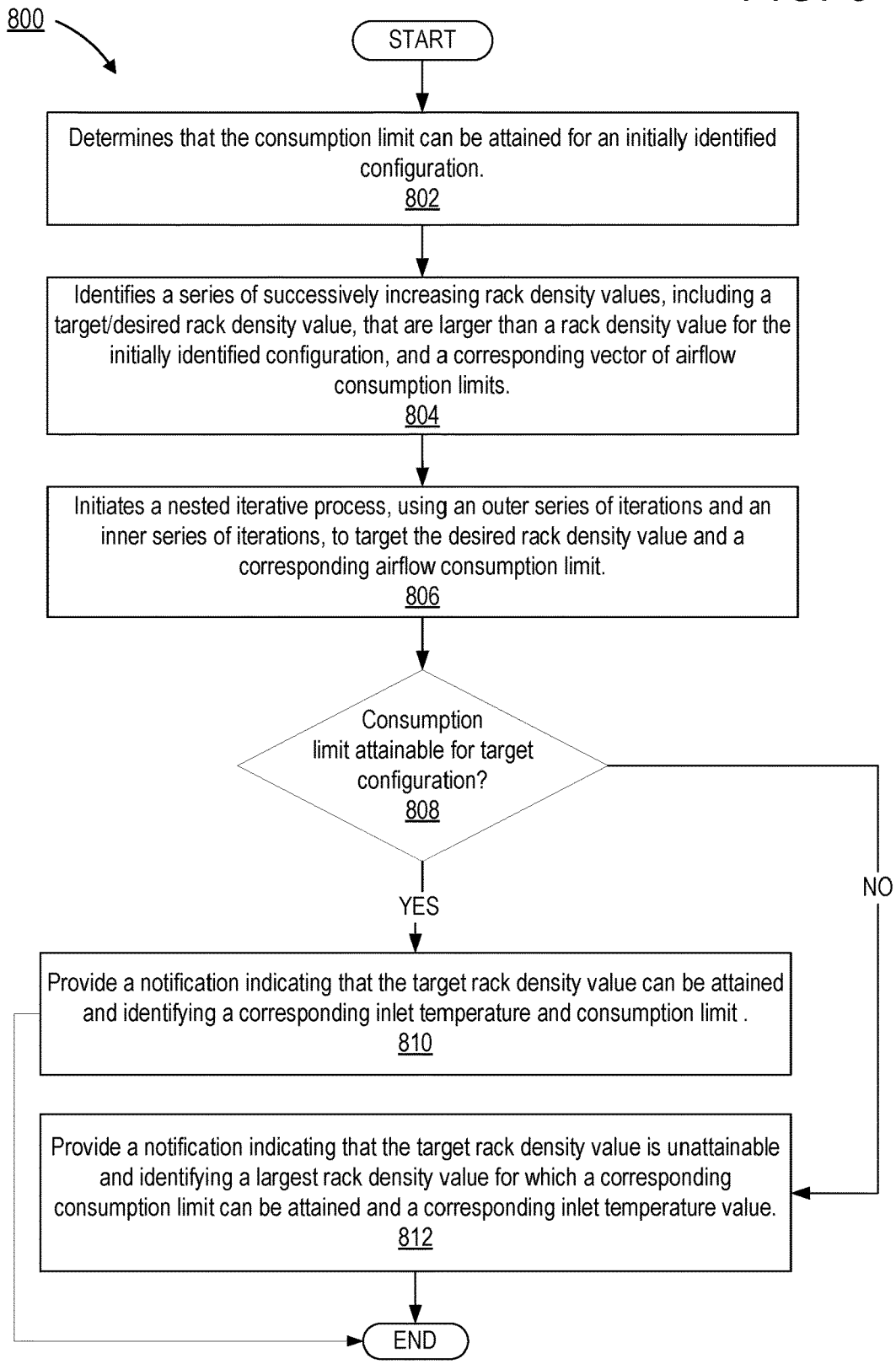
FIG. 8 is a flow chart illustrating a method for determining whether a target rack density value/system configuration can be attained while targeting a specified airflow consumption limit(s) for IHS 300, according to one embodiment.

FIGS. 6-8 presents flowcharts illustrating example methods by which IHS 100 and specifically processor 102/214 executing functional code of TPRM 212 presented within the preceding figures perform different aspects of the processes that enable one or more embodiments of the disclosure. Method 600 represents a method for determining optimum ambient temperature conditions that can be used to target desired cooling parameter constraints corresponding to IHS 300. Method 700 represents a method for determining optimum inlet temperature values that can be used to target an airflow consumption limit(s) identified for IHS 300. Method 800 represents a method for determining whether a target rack density value/configuration can be attained while targeting a specified airflow consumption limit(s) for IHS 300. The description of each method is provided with general reference to the specific components illustrated within the preceding figures. It is appreciated that certain aspects of the described methods may be implemented via other processing devices and/or execution of other code/firmware. In the discussion of FIGS. 6-8, reference is also made to elements described in FIGS. 1-5.

The method processes are performed by execution of TPRM 212 by processor 102/214, and are generally described as functions performed by TPRM 212, for simplification of the description. With reference to FIG. 6, method 600 begins at the start block and proceeds to block 602 at which TPRM 212 receives, from a user or data center manager, at least one target parameter value representing server cooling parameter constraints corresponding to an identified configuration for at least one server. TPRM 212 identifies a series of controlled values, from an acceptable range of ambient conditions, corresponding to the received target parameter value(s) (block 604). TPRM 212 determines whether the target parameter value is attainable (decision block 606). If TPRM 212 determines that the target parameter value is attainable, TPRM 212 provides a first notification, which indicates that the target parameter value can be attained and identifies conditions by which the target parameter value can be attained (block 608). However, if TPRM 212 determines that the target parameter value is not attainable, TPRM 212 provides a second notification indicating that the target parameter value is unattainable for IHS 300/the servers using the acceptable range of ambient conditions and recommending an adjustment to the server cooling parameter constraints and/or the selected configuration (block 610). The process concludes at the end block.

Method 700 begins at the start block and proceeds to block 702 at which TPRM 212 initiates an iterative process using an acceptable range of inlet temperature values to target an airflow consumption limit specified for the servers having an identified configuration. TPRM 212 transmits, to each respective server controller during each iteration of the iterative process, a corresponding successive value(s) for inlet temperature from OMPC device 100 to enable calculation of each respective airflow consumption value (block 704). TPRM 212 receives each respective airflow consumption value from each respective server controller (block 706). TPRM 212 aggregates airflow consumption values from respective server controllers to determine an aggregated airflow consumption value (block 708). TPRM 212 determines whether the aggregated consumption value matches or is substantially close to the airflow consumption limit (decision block 710). If TPRM 212 determines that the aggregated consumption value matches or is substantially close to the airflow consumption limit, TPRM 212 provides a first notification, which indicates that the airflow consumption limit can be attained and identifies a corresponding inlet temperature value used to attain the airflow consumption limit (block 714). However, if TPRM 212 determines that the aggregated consumption value does not match or is not substantially close to the airflow consumption limit, TPRM 212 determines whether a last iteration of the series of iterations has been completed (decision block 712). If TPRM 212 determines that the last iteration has not been completed, TPRM 212 continues the initiated iterative process (block 704). However, if TPRM 212 determines that the last iteration has been completed, TPRM 212 provides a second notification indicating that the airflow consumption limit is unattainable for the servers and recommends an adjustment to the server cooling parameter constraints and/or the identified configuration (block 716). The process concludes at the end block.

Method 800 begins at the start block and proceeds to block 802 at which TPRM 212 determines that the consumption limit can be attained for an initially identified configuration. TPRM 212 identifies a series of successively increasing rack density values, including a target/desired rack density value, that are larger than a rack density value for the initially identified configuration, and a corresponding vector of airflow consumption limits (block 804). TPRM 212 initiates a nested iterative process, using an outer series of iterations and an inner series of iterations, to target the desired rack density value and a corresponding airflow consumption limit (block 806). TPRM 212 performs the outer series of iterations using increasing rack density values (i.e., for corresponding configurations) and the inner series of iterations using the consumption limit vector. TPRM 212 determines whether the airflow consumption limit is attainable for the target rack density/configuration (decision block 808). If TPRM 212 determines that the airflow consumption limit is attainable for the target rack density, TPRM 212 provides a first notification indicating that the target rack density value can be attained and identifying a corresponding inlet temperature and airflow consumption limit (block 810). However, if TPRM 212 determines that the airflow consumption limit is not attainable for the target rack density, TPRM 212 provides a second notification indicating that the target rack density value is unattainable and identifying a largest rack density value for which a corresponding airflow consumption limit can be attained and a corresponding inlet temperature value that can be used to attain the airflow consumption limit (block 812). TPRM 212 identifies, via the second notification, the largest rack density value from among (a) the initial rack density value and (b) the series of rack density values used during the iterative process. Although the nested iterative process was described using increasing rack density values, TPRM 212 can similarly perform a nested iterative process using decreasing rack density values. The process concludes at the end block.

In the above described flow charts, one or more of the methods may be embodied in a computer readable device containing computer readable code such that a series of functional processes are performed when the computer readable code is executed on a computing device. In some implementations, certain steps of the methods are combined, performed simultaneously or in a different order, or perhaps omitted, without deviating from the scope of the disclosure. Thus, while the method blocks are described and illustrated in a particular sequence, use of a specific sequence of functional processes represented by the blocks is not meant to imply any limitations on the disclosure. Changes may be made with regards to the sequence of processes without departing from the scope of the present disclosure. Use of a particular sequence is therefore, not to be taken in a limiting sense, and the scope of the present disclosure is defined only by the appended claims.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. Computer program code for carrying out operations for aspects of the present disclosure may be written in any combination of one or more programming languages, including an object oriented programming language, without limitation. These computer program instructions may be provided to a processor of a general purpose computer, special purpose computer, such as a service processor, or other programmable data processing apparatus to produce a machine, such that the instructions, which execute via the processor of the computer or other programmable data processing apparatus, performs the method for implementing the functions/acts specified in the flowchart and/or block diagram block or blocks.

As will be further appreciated, the processes in embodiments of the present disclosure may be implemented using any combination of software, firmware or hardware. Accordingly, aspects of the present disclosure may take the form of an entirely hardware embodiment or an embodiment combining software (including firmware, resident software, micro-code, etc.) and hardware aspects that may all generally be referred to herein as a "circuit," "module," or "system." Furthermore, aspects of the present disclosure may take the form of a computer program product embodied in one or more computer readable storage device(s) having computer readable program code embodied thereon. Any combination of one or more computer readable storage device(s) may be utilized. The computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage device may be any tangible medium that can contain, or store a program for use by or in connection with an instruction execution system, apparatus, or device.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. An information handling system comprising:
   an open management power center (OMPC) device having a management controller communicatively coupled to at least one server controller of at least one server, each of the at least one server having a respective server controller;
   the management controller comprising:
      a processor;
      a target parameter recommendation module (TPRM) that executes on the processor and configures the processor to:
         receive at least one target parameter value identifying server cooling parameter constraints corresponding to a selected configuration for the at least one server;
         identify a series of controlled values, from an acceptable range of ambient conditions, corresponding to the received at least one target parameter value;
         iteratively determine, using the series of controlled values, whether the at least one target parameter value is attainable for the at least one server;
         in response to determining that the at least one target parameter value is attainable, provide a first notification indicating that the at least one target parameter value can be attained and identifying conditions by which the at least one target parameter can be attained;
         in response to iteratively determining that the at least one target parameter value is not attainable for the at least one server having the identified configuration, provide a second notification indicating that the at least one target parameter value is unattainable and recommending an adjustment to at least one of the server cooling parameter constraints and the identified configuration;
         determine, using a current inlet temperature value received from the OMPC, a corresponding fan speed by performing a set of calculations involving one or more of (a) an energy balancing calculation, (b) an open loop cooling system model, and (c) a case-to-ambient thermal resistance (ThetaCA) calculation; and
         determines an airflow consumption value using the corresponding fan speed.

2. The IHS of claim 1, wherein the processor:
   receives an airflow consumption limit corresponding to a specified server workload and configuration for the at least one server;
   identifies an acceptable inlet temperature range using the airflow consumption limit;
   wherein the airflow consumption limit is a first target parameter value of the at least one target parameter value;
   wherein said determining is performed iteratively using a sequence of inlet temperature values corresponding to the acceptable inlet temperature range;
   wherein the first notification indicates that the consumption limit value is attainable using an identified optimum inlet temperature value; and
   wherein the second notification indicates that the airflow consumption limit is unattainable using the acceptable inlet temperature range.

3. The IHS of claim 2, wherein the processor:
   transmits, during each iteration of the corresponding iterative process, a corresponding inlet temperature value from the OMPC to each respective server controller to enable calculation of each respective airflow consumption value;
   receive each airflow consumption value from each server controller;
   aggregate airflow consumption values from respective server controllers to determine an aggregated airflow consumption value;
   determine whether the aggregated consumption value is substantially close to the consumption limit value;
   in response to the aggregated consumption value being substantially close to the consumption limit value, provide said first notification; and
   in response to the aggregated consumption value not being substantially close to the consumption limit value during a corresponding evaluation, continue the iterative process if a current inlet temperature value is not a last value in the sequence of inlet temperature values.

4. The IHS of claim 1, wherein in determining whether the airflow consumption limit is attainable, the processor:
   in response to an airflow consumption limit being less than an initial airflow consumption limit, performs a series of iterations utilizing decreasing inlet temperature values.

5. The IHS of claim 1, wherein in determining whether the airflow consumption limit is attainable, the processor:

in response to an airflow consumption limit being larger than an initial airflow consumption limit, performs a series of iterations utilizing increasing inlet temperature values.

6. The IHS of claim 1, wherein:

the at least one target parameter value comprises a first selected rack server density value and consumption limit value vector, wherein said first selected rack server density value is a smaller rack density value that is less than a current, initial rack density value, said consumption limit value vector corresponding to a series of values comprising (a) rack server values ranging between the initial rack density value and the selected rack density value and (b) the selected rack density server value;

a length of the series of rack server density values indicates a specified number of candidate server/system configurations for which a respective consumption limit value is specified via the consumption limit value vector; and the processor:

executes a nested iterative process to determine whether the selected target rack density value can be attained while satisfying the corresponding airflow consumption limit, wherein said iterative process includes utilizing an outer iterative process based on the series of rack server density values and an inner iterative process based of the consumption limit value vector;

in response to determining that the consumption limit value is unattainable using the initial rack density value, initiates the nested iterative process to determine whether the consumption limit value can be attained for the smaller selected rack density value via (i) the outer series of iterations utilizing decreasing values for rack server density and (ii) the inner series of iterations utilizing a sequence of inlet temperature values to target a corresponding consumption limit value;

in response to determining that the consumption limit value can be attained for the smaller rack density value, provides a third notification indicating that the consumption limit value can be attained for the smaller rack density value and identifying an optimum inlet temperature value at which the corresponding consumption limit can be attained; and in response to iteratively determining that the consumption limit cannot be attained for the selected, smaller rack density value, provides a fourth notification indicating that the consumption limit value cannot be attained for the smaller rack density value.

7. The IHS of claim 1, wherein the processor:

receives target parameter values including an airflow consumption limit and an identified, larger rack density value, which is larger than a current, initial rack density value;

in response to determining that the consumption limit value is attainable for the initial system/server configuration, initiates the nested iterative process to determine whether an attainment of the consumption limit can be maintained for the larger rack density value;

wherein said nested iterative process includes (i) an outer series of iterations utilizing increasing values for rack server density and (ii) an inner series of iterations utilizing a sequence of inlet temperature values to target the corresponding airflow consumption limit;

in response to iteratively determining that an attainment of the consumption limit value can be maintained for the larger rack density value, provides a third notification indicating that the consumption limit value can be maintained for the desired larger rack density value and identifying an optimum inlet temperature value at which the consumption limit can be attained; and in response to iteratively determining that an attainment of the consumption limit value cannot be maintained for the larger rack density value, provides a fourth notification indicating that the consumption limit value cannot be maintained for the larger rack density value, and identifying, from among the initial rack density value and the series of rack density values, a largest rack density value for which a corresponding consumption limit value can be attained.

8. The IHS of claim 1, wherein the processor:

iteratively determines whether at least one target parameter value is attainable for (a) a first set of servers using a set of calculations performed by the server controllers to determine airflow consumption for various different inlet temperature values and (b) a second set of servers using pre-established estimated values for airflow consumption for various different inlet temperature values without utilizing calculations performed by a server controller.

9. A method performed in an information handling system (IHS), the method comprising:

receiving at least one target parameter value identifying server cooling parameter constraints corresponding to a selected configuration for the at least one server;

identifying a series of controlled values, from an acceptable range of ambient conditions, corresponding to the received at least one target parameter value;

iteratively determining, using the series of controlled values, whether the at least one target parameter value is attainable for the at least one server;

in response to determining that the at least one target parameter value is attainable, providing a first notification indicating that the at least one target parameter value can be attained and identifying conditions by which the at least one target parameter can be attained;

in response to iteratively determining that the at least one target parameter value is not attainable for the at least one server having the identified configuration, providing a second notification indicating that the at least one target parameter value is unattainable and recommending an adjustment to at least one of the server cooling parameter constraints and the identified configuration;

determining, using a current inlet temperature value received from the OMPC, a corresponding fan speed by performing a set of calculations involving one or more of (a) an energy balancing calculation, (b) an open loop cooling system model, and (c) a case-to-ambient thermal resistance (ThetaCA) calculation; and determining an airflow consumption value using the corresponding fan speed.

10. The method of claim 9, further comprising:

receiving an airflow consumption limit corresponding to a specified server workload and configuration for the at least one server;

identifying an acceptable inlet temperature range using the received airflow consumption limit;

wherein the airflow consumption limit is a first target parameter value of the at least one target parameter value;

wherein said determining is performed iteratively using a sequence of inlet temperature values corresponding to the acceptable inlet temperature range;

wherein the first notification indicates that the consumption limit value is attainable using an identified optimum inlet temperature value; and wherein the second notification indicates that the airflow consumption limit is unattainable using the acceptable inlet temperature range.

11. The method of claim 10, further comprising:

transmitting, during each iteration of the corresponding iterative process, a corresponding inlet temperature value from the OMPC to each respective server controller to enable calculation of each respective airflow consumption value;

receiving each airflow consumption value from each server controller;

aggregating airflow consumption values from respective server controllers to determine an aggregated airflow consumption value;

determining whether the aggregated consumption value is substantially close to the consumption limit value;

in response to the aggregated consumption value being substantially close to the consumption limit value, providing said first notification; and in response to the aggregated consumption value not being substantially close to the consumption limit value during a corresponding evaluation, continuing the iterative process if a current inlet temperature value is not a last value in the sequence of inlet temperature values.

12. The method of claim 9, wherein said at least one target parameter value is an airflow consumption limit, and the method further comprises:

in response to the airflow consumption limit being less than an initial airflow consumption limit, performing a series of iterations utilizing decreasing inlet temperature values.

13. The method of claim 9, wherein said at least one target parameter value is an airflow consumption limit, and the method further comprises:

in response to the airflow consumption limit being larger than an initial airflow consumption limit, performs a series of iterations utilizing increasing inlet temperature values.

14. The method of claim 9, wherein:

the at least one target parameter value comprises a first selected rack server density value and consumption limit value vector, wherein said first selected rack server density value is a smaller rack density value that is less than a current, initial rack density value, said consumption limit value vector corresponding to a series of values comprising (a) rack server values ranging between the initial rack density value and the selected rack density value and (b) the selected rack density server value;

a length of the series of rack server density values indicates a specified number of candidate server/system configurations for which a respective consumption limit value is specified via the consumption limit value vector; and the method further comprising:

executing a nested iterative process to determine whether the selected target rack density value can be attained while satisfying the corresponding airflow consumption limit, wherein said iterative process includes utilizing an outer iterative process based on the series of rack server density values and an inner iterative process based of the consumption limit value vector;

in response to determining that the consumption limit value is unattainable using the initial rack density value, initiating the nested iterative process to determine whether the consumption limit value can be attained for the smaller selected rack density value via (i) the outer series of iterations utilizing decreasing values for rack server density and (ii) the inner series of iterations utilizing a sequence of inlet temperature values to target a corresponding consumption limit value;

in response to determining that the consumption limit value can be attained for the smaller rack density value, providing a third notification indicating that the consumption limit value can be attained for the smaller rack density value and identifying an optimum inlet temperature value at which the corresponding consumption limit can be attained; and in response to iteratively determining that the consumption limit cannot be attained for the selected, smaller rack density value, providing a fourth notification indicating that the consumption limit value cannot be attained for the smaller rack density value.

15. The method of claim 9, further comprising:

receiving target parameter values including an airflow consumption limit and an identified, larger rack density value, which is larger than a current, initial rack density value;

in response to determining that the consumption limit value is attainable for the initial system/server configuration, initiating the nested iterative process to determine whether an attainment of the consumption limit can be maintained for the larger rack density value;

wherein said nested iterative process includes (i) an outer series of iterations utilizing increasing values for rack server density and (ii) an inner series of iterations utilizing a sequence of inlet temperature values to target the corresponding airflow consumption limit;

in response to iteratively determining that an attainment of the consumption limit value can be maintained for the larger rack density value, providing a third notification indicating that the consumption limit value can be maintained for the desired larger rack density value and identifying an optimum inlet temperature value at which the consumption limit can be attained; and in response to iteratively determining that an attainment of the consumption limit value cannot be maintained for the larger rack density value, providing a fourth notification indicating that the consumption limit value cannot be maintained for the larger rack density value, and identifying, from among the initial rack density value and the series of rack density values, a largest rack density value for which a corresponding consumption limit value can be attained.

16. The method of claim 9, further comprising:

iteratively determining whether at least one target parameter value is attainable for (a) a first set of servers using a set of calculations performed by the server controllers to determine airflow consumption for various different inlet temperature values and (b) a second set of servers using pre-established estimated values for airflow consumption for various different inlet temperature values without utilizing calculations performed by a server controller.

* * * * *